Nov. 29, 1938. F. R. BORGFELDT 2,138,442

SYNCHRONOUS MOTOR FOR ELECTRIC CLOCKS AND THE LIKE

Original Filed May 3, 1935

Inventor
Frederic R. Borgfeldt,
By Wilkinson, Huxley,
Byron & Knight
Attorney

Patented Nov. 29, 1938

2,138,442

UNITED STATES PATENT OFFICE 2,138,442

SYNCHRONOUS MOTOR FOR ELECTRIC CLOCKS AND THE LIKE

Frederic R. Borgfeldt, Middlebury, Ind., assignor, by mesne assignments, to Globe American Corporation, Macomb, Ill., a corporation of Illinois Original application May 3, 1935, Serial No. 19,666. Divided and this application March 28, 1936, Serial No. 71,435

9 Claims. (Cl. 172—275)

The present invention relates to electric clocks, and more in particular to a motor for operating the same, this application being a division of application Serial No. 19,666, filed May 3, 1935.

Among the objects of the present invention is to provide a novel motor of the non-self-starting synchronous type particularly adapted for use in driving a gear train of a clock mechanism, the motor being simple in construction and economically manufactured.

Heretofore motors of the non-self-starting synchronous type which have been used for driving a gear train of a clock mechanism have included a rotor and field poles or pieces having aligned polar projections substantially concentrically arranged with a uniform air gap therebetween. Such motors, when used in electric clocks, have the undesirable characteristic of being noisy and are particularly subject to hunting, thereby necessitating costly refinements in other parts of the clock mechanism in order to insure accuracy and to eliminate as much of the unavoidable noises of the motor as possible. The objectionable noises apparently are due to shifting of the rotor shaft in its bearings, which shifting is caused by uncontrolled flux strength at different points in the gap between the rotor and the field pieces.

It has been found, however, that this noise may be avoided if the width of the gap is varied outwardly from approximately the center of the field pieces.

It is therefore an object of the present invention to provide a motor of the non-self-starting synchronous type which will operate efficiently and which is characterized by its freedom from noise.

Other objects, features, capabilities and advantages are comprehended by the invention, as will later appear and as are inherently possessed thereby.

Referring to the drawing.

Figure 1:
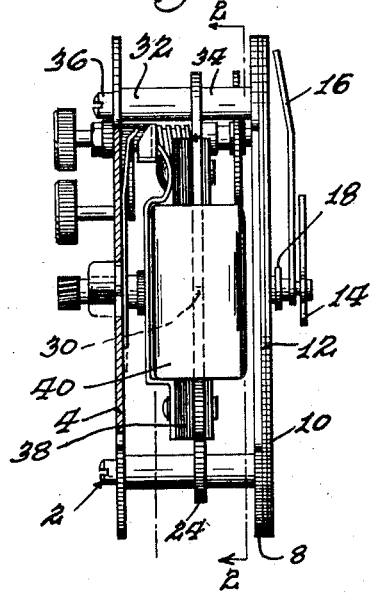
Figure 1 is a view in elevation of the rear part of a clock mechanism incorporating a motor made in accordance with the present invention.
Figure 2:
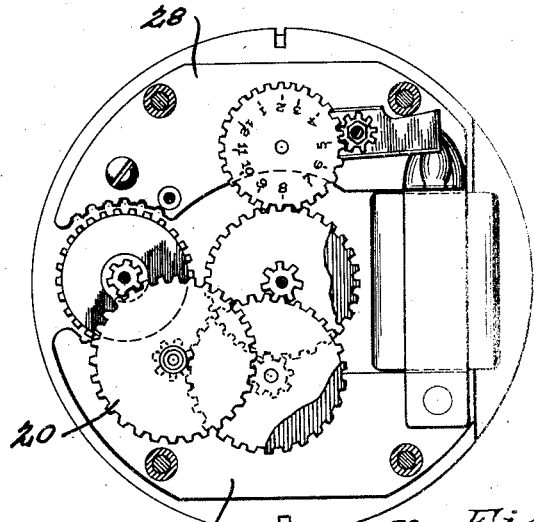
Figure 2 is a view in cross-section of the clock mechanism taken in the plane represented by line 2—2 of Figure 1 of the drawing.

Referring now more in detail to the drawing, a synchronous motor made in accordance with the present invention is disclosed in a clock mechanism generally referred to as 2 which comprises a rear plate 4 and a front plate 8 upon which is mounted a dial 10 having the clock numerals painted or otherwise placed thereon, a pad 12 being interposed between the dial 10 and the front plate 8. The clock is provided with second, minute and hour hands 14, 16 and 18, respectively, mounted for movement over the dial 10 and driven by a train of gears generally referred to as 20.

The train of gears 20 for the clock mechanism is driven by means of a synchronous motor of the non-self-starting type, this motor comprising a rotor 22 and a field structure. The field structure includes a yoke 24 which, in the embodiment disclosed, comprises two plates 26 and 28 spaced as at 30 and mounted between the plates 4 and 8 at a plurality of points between pillars 32 and 34 which are staked to the plates 4 and 8, respectively, and have their ends protruding into openings provided in the yoke 26, these pillars being maintained in position to rigidly mount the yoke 26 as by means of bolts 36 passing downwardly therethrough and engaging threads in the pillars 34.

Figure 3:
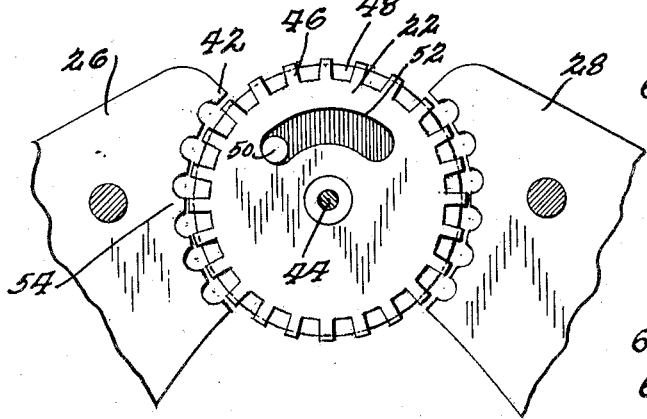
Figure 3 is an enlarged fragmentary view in cross-section of the clock mechanism showing the rotor and field structure of the electric motor of the present invention.

Mounted on the central part of the yoke 24 and spanning the gap 30 is a plurality of strips of metal 38 around which is a winding 40 forming the exciter for the motor, this winding being connected through suitable leads to any source of alternating current. The yoke, together with the laminations 38, provides a core for the winding 40 and provides an alternating flux at the ends of plates 26 and 28. As shown in Figure 3 of the drawing, the plates 26 and 28 terminate in opposite relation to the axis of the rotor 22 and are each formed with a plurality of polar projections 42, the plates being unlaminated and the polar projections being unwound. The rotor 22 is fixedly mounted upon the shaft 44 for rotation and is likewise formed with a plurality of unlaminated and unwound polar projections 46. Adjacent the rotor 22 and freely mounted upon the shaft 44 is an inertia member 48 provided with a pin 50 projecting within a slot 52 formed in the rotor 22, this inertia member 48 being provided to secure uniform rotation of the rotor even though there may be fluctuations in the alternating current circuit. It has been found that improved operation in a synchronous motor of the type disclosed can be effected by varying the angular spacing of the polar projections 42 and 46 of the field poles and rotor, respectively. The spacing between the polar projections 42 and 46 is a minimum at the center polar projection 54 of the pole pieces of the field structure, and this spacing gradually increases in width to a maximum between the end polar projections 42 and the projections on the rotor.

Where it is desirable to construct the projections on the rotor and the field poles of substantially the same width and to provide a motor with these air gaps varying in width as disclosed, then the angular spacing between the centers of the projections on the field poles must be less than the angular spacing between the centers of the projections on the rotor in order to provide a motor which will operate with a minimum amount of hunting. Such a construction is disclosed in Figure 3 of the drawing, wherein the polar projections 42 are angularly spaced apart approximately 14° 20′, while the angular spacing of the polar projections 46 on the rotor is approximately 15°.

Figure 4:
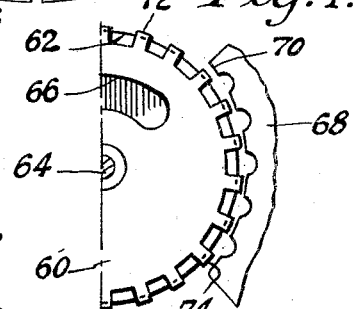
Figure 4 is a fragmentary view similar to Figure 3 of the drawing showing a modified construction for the rotor and field structure.
Figure 5:
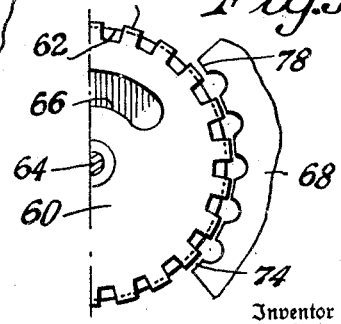
Figure 5 is a fragmentary view corresponding to Figure 4 of the drawing showing still another modified construction for the rotor and field structure.

However, a motor of improved construction incorporating these air gaps which vary in width may be provided wherein the angular spacing of the projections on the rotor and the field poles is the same. In this case, however, there must be a difference in width of the projections on the rotor and field poles in order to properly align the projections on the rotor and field poles to secure a motor which will operate with a minimum of hunting. The projections on the rotor may be wider than the projections on the field poles, or vice versa, in order to obtain the desired results. Such modified constructions are shown in Figures 4 and 5. For example, in Figure 4 of the drawing, the motor is of the same general construction as the motor shown in Figure 3 and includes the rotor 60 and the adjacently disposed inertia member 62 both of which are mounted on the shaft 64, the rotor being fixed thereto and the inertia member being loosely mounted thereon. The rotor is formed with the slot 66 adapted to receive a pin as in the embodiment of Figure 3, said inertia member serving its well known function of producing uniform rotation of the rotor. The field poles, such as 68, are disposed as in Figure 3 and are each provided with a series of polar projections 70, the faces of which are defined by the periphery of a circle whose radius is greater than the radius of the rotor forming the rotor projections 72 whereby the air gap 74 varies in width from the center of the pole piece to the end. In this embodiment the angular spacing of the projections on the rotor and on the field poles is the same and the width of the projections on the field poles is greater than the width of the projections on the rotor.

In Figure 5, the motor assembly is substantially the same as shown in Figure 4 and includes the same elements associated in substantially the same manner so that similar reference characters refer to similar elements. In this embodiment, however, the rotor is provided with the projections 76 of greater width than the width of the projections 78 formed on the field poles 68, although the angular spacing of these projections is the same.

Heretofore, where the angular spacing of the rotor and field projections have been equal and the rotor mounted concentrically between the field projections, undesirable noise was present due to the shifting of the rotor shaft in its bearings, this being caused by uncontrolled flux strength at different points in the gap between the rotor and field projections. This may be due to the internal characteristics of the metal at different points both in the rotor and field projections.

The present invention comprehends the idea of eliminating this undesirable noise. By providing an air gap having its narrowest point between the rotor and field poles at approximately the center of the field poles, the flux is concentrated at these points, and because of this concentration of flux the shifting of the rotor within its bearings is decreased to a minimum. In order to provide for these air gaps which vary in width as above described, the angular spacing of the projections on the rotor and the field poles must vary where the projections are of the same width, which feature is desirable to provide a motor wherein there is a minimum of hunting of the rotor. However, the angular spacing of these projections may be the same as shown, if there is a difference in the width of the projections on the rotor and field poles.

While I have herein described and upon the drawing shown an illustrative embodiment of the invention, it is to be understood that the invention is not limited thereto but may comprehend other constructions, arrangements of parts, details and features without departing from the spirit of the invention.

I claim:

1. In a multi-polar synchronous motor, the combination of a plurality of field pieces each having a series of unwound polar projections, an armature disposed therebetween and having a series of unwound polar projections, the air gaps between said rotor and field pieces varying in width from approximately the center of said pieces outwardly.

2. In a multi-polar synchronous motor, the combination of a plurality of field pieces each having a series of unwound polar projections, an armature disposed therebetween and having a series of unwound polar projections, the air gaps between said rotor and field pieces varying in width from approximately the center of said pieces outwardly, the angular spacing of the projections on the rotor and field pieces being different.

3. In a bi-polar synchronous motor, the combination of oppositely disposed field structures each having an unwound portion provided with a series of unwound polar projections, an armature disposed therebetween and having a series of unwound polar projections, the air gaps between said rotor and field structure varying in width, said polar projections on the field structures and the armature being of different width and the angular spacing thereof being substantially the same to provide a motor operable with a minimum of hunting.

4. In a multi-polar synchronous motor, the combination of a plurality of field pieces each having a series of unwound polar projections, an armature disposed therebetween and having a series of unwound polar projections, the air gaps between said rotor and field pieces varying in width, said polar projections on the field pieces and the armature being of different width and the angular spacing thereof being substantially the same to provide a motor operable with a minimum of hunting.

5. In a synchronous motor, the combination of a plurality of field structures each having a series of unwound polar projections, an armature disposed therebetween and having a series of unwound polar projections, the air gaps between said armature and field structures varying in width from approximately the center of said structures outwardly, said polar projections on the field structures and the armature being of substantially equal width and the angular spacing thereof being different.

6. In a synchronous motor, the combination of a plurality of field structures each having a series of unwound polar projections, an armature disposed therebetween and having a series of unwound polar projections, the air gaps between said armature and field structures varying in width from approximately the center of said structures outwardly, said polar projections on the field structures and the armature being of substantially equal width and the angular spacing of the polar projections on said armature being greater than the angular spacing of the polar projections on said field structures.

7. In a synchronous motor, the combination of a plurality of field structures each having a series of unwound polar projections, an armature disposed therebetween and having a series of unwound polar projections, the air gaps between said armature and field structures varying in width from approximately the center of said structures outwardly, said polar projections on the field structures and the armature being of different width and the angular spacing thereof being susbtantially the same.

8. In a synchronous motor, the combination of a plurality of field structures each having a series of unwound polar projections, an armature disposed therebetween and having a series of unwound polar projections, the air gaps between said armature and field structures varying in width from approximately the center of said structures outwardly, said polar projections on the field structures having a width greater than the width of the polar projections on said armature and the angular spacing of said polar projections being substantially the same.

9. In a synchronous motor, the combination of a plurality of field structures each having a series of unwound polar projections, an armature disposed therebetween and having a series of unwound polar projections, the air gaps between said armature and field structures varying in width from approximately the center of said structures outwardly, said polar projections on the armature having a width greater than the width of the polar projections on said field structures and the angular spacing of said polar projections being substantially the same.

FREDERIC R. BORGFELDT.